Feb. 10, 1925.

M. R. JULIAN 1,525,504

REGISTERING AND CONTROLLING MECHANISM FOR LIQUID MEASURING PUMPS

Filed Jan. 8, 1923 6 Sheets-Sheet 3

Feb. 10, 1925.

M. R. JULIAN

1,525,504

REGISTERING AND CONTROLLING MECHANISM FOR LIQUID MEASURING PUMPS

Filed Jan. 8, 1923

Feb. 10, 1925.
M. R. JULIAN
1,525,504
REGISTERING AND CONTROLLING MECHANISM FOR LIQUID MEASURING PUMPS
Filed Jan. 8, 1923
6 Sheets-Sheet 5

Inventor
Marcena R. Julian
By
Clarence S. Walker
His Attorney

Feb. 10, 1925. 1,525,504
M. R. JULIAN
REGISTERING AND CONTROLLING MECHANISM FOR LIQUID MEASURING PUMPS
Filed Jan. 8, 1923 6 Sheets-Sheet 6

Patented Feb. 10, 1925.

1,525,504

UNITED STATES PATENT OFFICE.

MARCENA R. JULIAN, OF JAMESTOWN, NEW YORK, ASSIGNOR OF ONE-THIRD TO ALMER N. BROADHEAD, OF JAMESTOWN, NEW YORK, AND ONE-THIRD TO DAN W. McCARTHY, OF LAKEWOOD, NEW YORK.

REGISTERING AND CONTROLLING MECHANISM FOR LIQUID-MEASURING PUMPS.

Application filed January 8, 1923. Serial No. 611,528.

*To all whom it may concern:*

Be it known that I, MARCENA R. JULIAN, a citizen of the United States, residing at the city of Jamestown, in the county of Chautauqua and State of New York, have invented certain new and useful Improvements in Registering and Controlling Mechanism for Liquid-Measuring Pumps, of which the following, taken in connection with the accompanying drawings, is a specification.

The invention relates to measuring pump for liquids, and is especially applicable to the vacuum liquid measuring pump shown in my application for Letters Patent filed December 27th, 1920, Serial Number 433,174 of which this is a continuation in part.

The primary object of this invention is to provide a controlling and registering mechanism for said liquid measuring pump which starts and automatically stops said mechanism, said registering mechanism being mechanically actuated by the pumping mechanism to register a number of gallons or measuring containers; and said control mechanism being so constructed that it may be set to measure a predetermined number of gallons or measuring containers, and automatically stop when said predetermined number has been registered.

A further object is to provide, in connection with said control and registering mechanism, a plurality of indicators so that the sales of different operators may be registered by said registering mechanism as well as the whole amount of liquid measured by all the operators of said pump, separate registering mechanism with individual lock and key being provided for each operator, the unlocking of one of said separate registering mechanism being a necessary prerequisite to the operation of said pump.

Other objects reside in the details of construction set forth in the following specification taken in connection with the accompanying drawing which forms a part thereof and in which—

Referring to the drawings the numeral 25 designates the pedestal which is preferably a casing enclosing a portion of the control mechanism for the operation of the pump, a door 26 admitting to said control mechanism being provided. At one side of the chamber of said casing is a feed or inlet pipe 27.

On the pedestal 25 is mounted a transparent, preferably glass, container or reservoir 28 which is preferably cylindrical and has the measuring container 29 supported therein. The container 29 measures a predetermined unit, preferably a gallon, when filled to the tripping point at which it is emptied into the reservoir. The outer reservoir or delivery container 28 is supported on the top 30 of the pedestal 25 and is capped by a plate 31 which is attached to the pedestal top 30 by means of a plurality of suitable stay bolts or rods 32, the cap plate 31 being preferably adapted to support an electric light globe 33 with the connecting tube 34 thereto at one side for the electric wire connection 35. The tube 36 on the opposite side gives symmetry to the appearance of the pump head and at the same time provides free air within the cap plate 31 so that there is always sufficient free air within the reservoir 28 to give free flow to the liquid from the delivery container or reservoir 28.

The measuring container 29 is supported within the delivery container 28 upon the inlet pipe or tube 27 and has the cap plate 37, which cap plate is connected to the vacuum suction pipe 38. The measuring container 29 has the vertically movable bottom 39 which is supported by the weight 40 connected to said bottom 39 by means of the vertical rod 41 and links 42, which links are pivoted to the casing 25 at 43. Connected to the rod 41 is a rod 44 by which the controlling and registering mechanisms are actuated.

The measuring features above set forth are described and claimed in detail in my co-pending application, Serial No. 433,174 and form no part of the present application which is directed to controlling and registering mechanism applicable to other types of pump mechanism than the one here illustrated. Said controlling and registering mechanism is enclosed by a casing 45 which has the door 46 and said actuating rod 44 preferably extending down through said casing or box 45.

*Controlling mechanism.*

Figure 3:
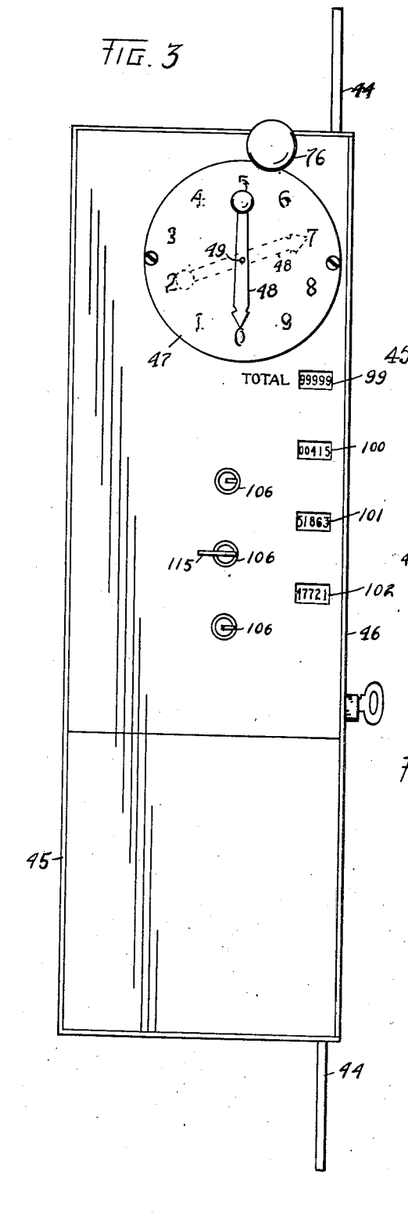
Fig. 3 is a front elevation of said case for the controlling and registering mechanism showing the measuring control dial and pointer and starting lever and the different locks and registers for individual operators as well as the register for the total amount measured.

The controlling mechanism includes a dial 47 on the front of said box or casing 45 which has a pointer 48 attached on the end of the shaft 49 which shaft extends horizontally through and is supported upon said box or casing 45 at the center of said dial. Upon the dial are marked a series of graduated spaced numerals for the number of units to be supplied so that the pointer 48 can be turned to indicate any desired number to be measured as hereinafter described. The pointer 48 being firmly secured to the shaft 49 acts as a handle therefor and consequently any movement of the pointer is transmitted to the shaft.

Figure 4:
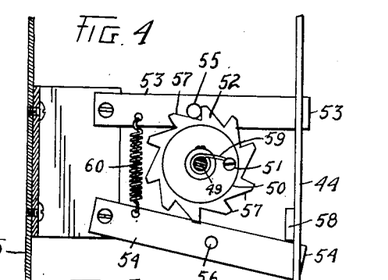
Fig. 4 is a detail side elevation of the escapement mechanism.
Figure 5:
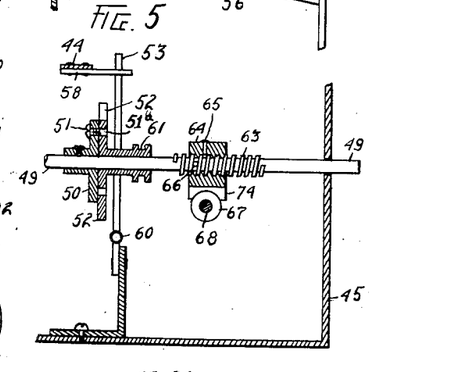
Fig. 5 is a section taken along the line 5—5 of Fig. 2 showing details of the control mechanism.

A clutch 50 attached to the shaft 49 has a pin 51 which is insertable in a hole 51$^a$ of an escapement wheel 52 which is sleeved upon the shaft. This wheel has the spring pressed escapement levers 53 and 54 on the opposite sides thereof provided with pins 55 and 56 which engage the teeth 57 of the escapement wheel 52 and prevent its rotation in the counter clockwise direction (see Fig. 4). In the wheel 52 are provided a plurality of the holes 51$^a$ which correspond in number and spacing to the figures on the dial 47. When the pin 51 rests in any one of these holes the wheel will, of course, be rotated when the shaft is turned in the clockwise direction, the levers 53, 54 permitting such movement. If, however, it is for any reason desired to turn the pointer backward; that is, in the counter clockwise direction, the levers 53, 54 by their engagements with the teeth 57 prevent any movement of the wheel in that direction. Under such conditions, which arise for example when the operator has set the machine for the supply of more liquid than desired, the shaft 49 is retracted by the pointer 48 until the pin 51 is free from the wheel so that the pointer can be reset.

From the rod 44 extends an arm 58 which engages the ends of said escapement levers 53 and 54 as the rod is raised and lowered by the movement of the bottom plate 39 of the measuring container 29. A spring 59 normally tends to rotate the shaft 49 against the pins 55, 56. As the actuating rod 44 is raised and lowered levers 53 and 54 alternately release the escapement wheel 52 so that the shaft 49 turns under the action of the spring 59 step by step one-half a tooth at a time. A spring 60 connecting the levers 53, 54 normally holds the pins 55, 56 in engagement with the wheel. The escapement wheel 52 is held firmly yet rotatably in position upon the shaft 49 by a bracket 62 which engages a grooved collar 61 projecting from the wheel.

Figure 6:
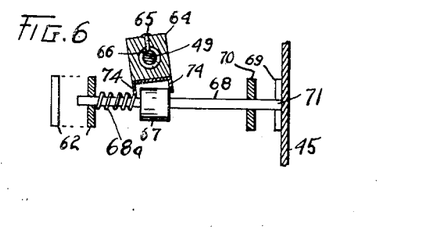
Fig. 6 is a section taken along the line 6—6 in Fig. 2 showing a detail of that portion of the control mechanism.
Figure 7:
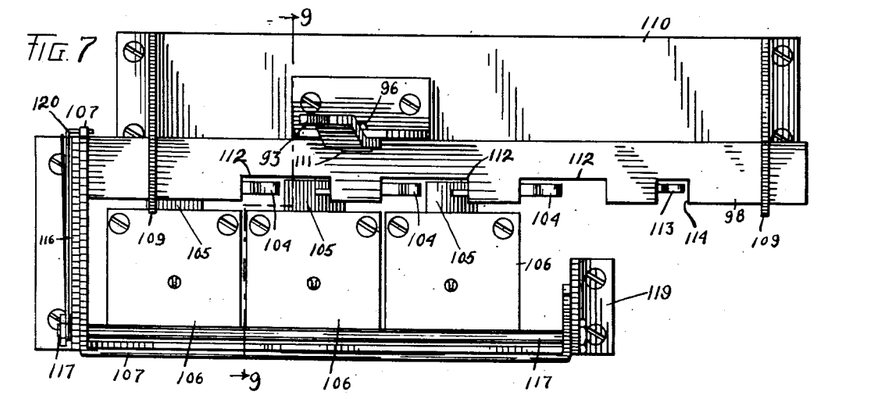
Fig. 7 is an elevation of the inner side of a plurality of individual locks showing the lock control mechanism whereby a number of operators can have keys to said registering and locking mechanism to use the same to actuate individual registers for each operator.

The mechanism, which includes the shaft and pointer 48, is automatically controlled by a worm 63 on the shaft 49 and a threaded nut 64 which loosely engages therewith. The nut 64 is provided with a screw pin 65 which extends into the thread of the worm 63 and follows said worm when said shaft 49 is rotated with the pointer 48. A stop 66 in the thread of the worm 63 will strike the screw pin 65 at a predetermined point in the rotation of the shaft and turn the nut 64 as shown in Fig. 6. One side of the nut 64 is provided with arms 74 which enclose therein a stop 67 on a vertical spring locking pin 68. When said screw 65 strikes the stop 66 in the worm 63, the shaft 49 and pointer 48 thereon has a spaced distance yet to move before reaching the zero position. When the pointer reaches the zero position, the pin 65 engaging the stop 66 has turned the nut 64 sufficiently to withdraw the spring locking pin 68 out of engagement with the inner end of a return control bar 69.

The spring locking pin 68 is slidably supported by the bracket 62 at one end and a bracket 70 at the other, and, when the pump is in operation, the upper end 71 of the spring locking pin 68 under the action of a coiled spring 68ª lies in front of the inner end of a bar 69 and prevents its movement under the influence of a spring 72 extending from the bracket 70 to the downwardly turned end 73 of said return bar 69.

The starting of the pump is controlled by a lever 76 which closes the electric switch of a motor (not shown) by means of connections to be described later. The lever 76 is slidably supported by the bracket 70 at the inner end and a slot in the casing 45 through which it projects, its outer end terminating above the dial 47 (see Fig. 3). Attached to the lever 76 is an arm 75 which lies in front of the downwardly turned end 73 of the bar 68 so that the bar 69 will be retracted with the lever 76.

The rod 44 is held inactive by a pin 79, the end 82 of which normally lies in the slot 83. The pin 79 is slidably supported by brackets 80, 81 and is provided with a stop 78. Surrounding the pin 79 between the stop 78 and the bracket 81 is a spring 78ª which urges the pin toward the rod 44. The pin 79 is retracted from engagement with the rod 44 by a cam 77 on the lever 76 which engages the stop 78 when the lever is drawn out and moves the pin 79 against the tension of the spring 78ª.

Figure 18:
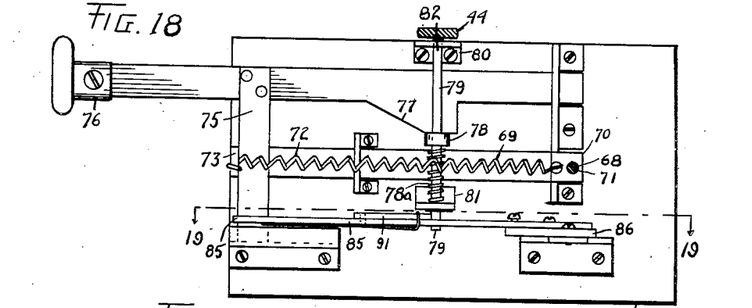
Fig. 18 is a plan view of said starting and stopping mechanism in the unlocked position showing the pump rod released.
Figures 19, 20, 21:
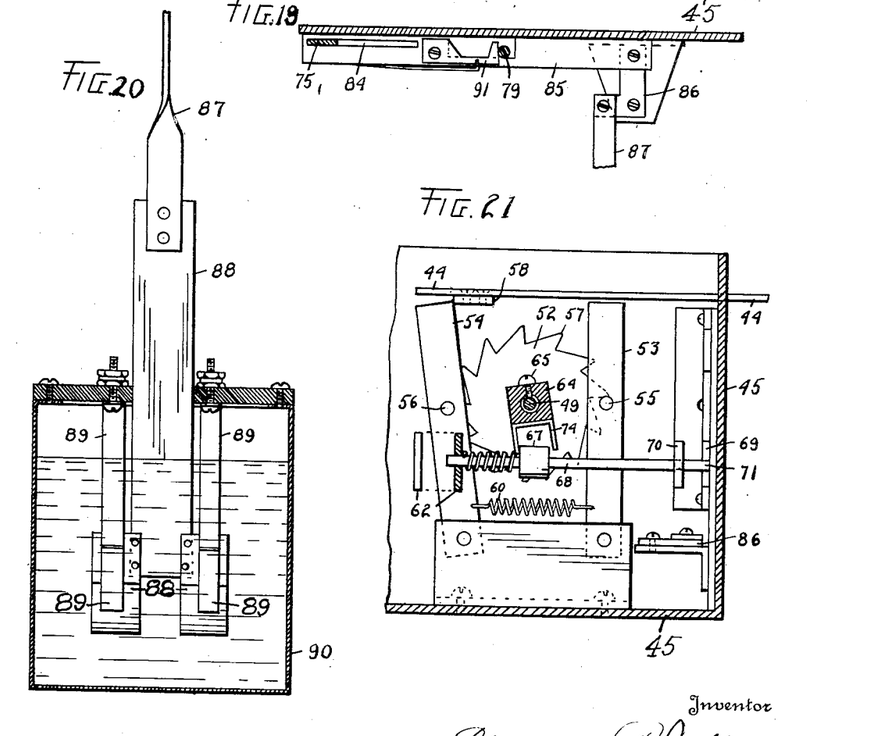
Fig. 19 is a sectional view at line 19—19 in Fig. 18 showing the switch actuating bar in the lowered contacting position.
Fig. 20 is a sectional view of the switch box at line 20—20 in Fig. 2 showing the contact bar in the contact position.
Fig. 21 is a sectional view at line 21—21 in Fig. 2 showing the spring locking pin in the locking position for the return control bar.

The arm 75 of the starting lever 76 slidably engages in a slot 84 of a bar 85 so that the movement of said arm 75 when the starting lever 76 is retracted, shifts the bar 85 as shown in Figs. 18 and 19, thereby actuating a bell crank 86. Connected to the bell crank 86 is a bar 87 attached at its lower end to a switch contact bar 88, which engages spring contact plates 89 in the oil switch box 90 when the starting is retracted.

Figure 1:
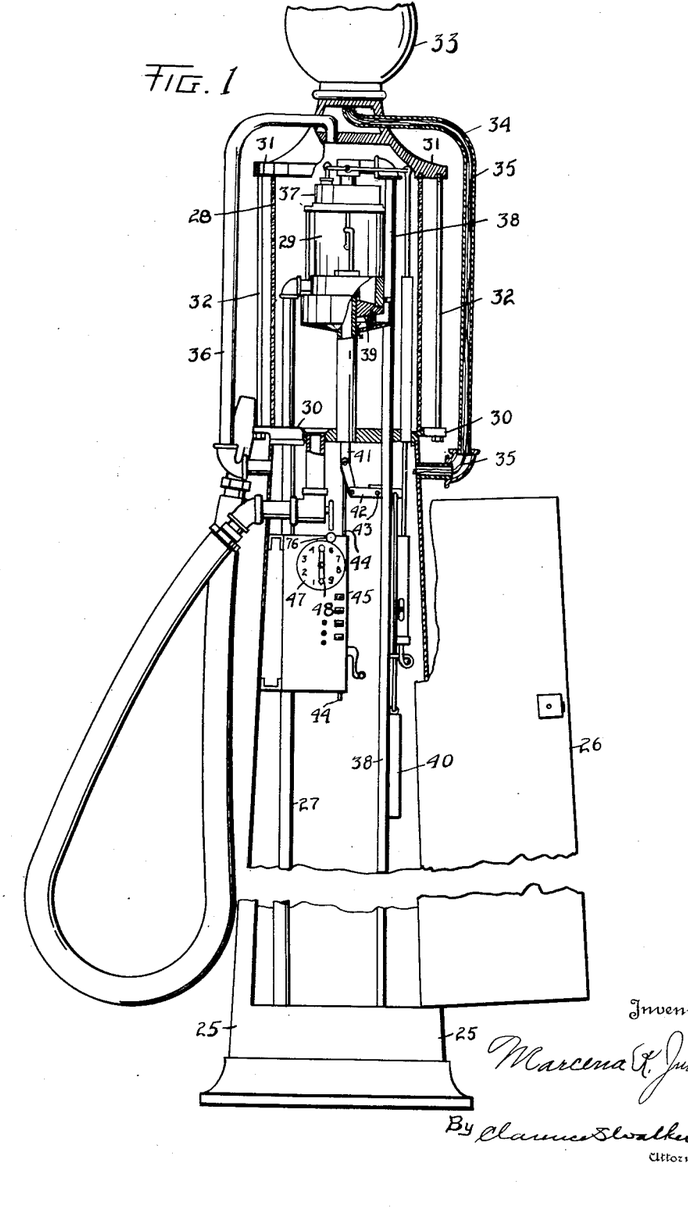
Figure 1 is a front elevation of one embodiment of this invention, the liquid measuring pump in the upper portion of the pedestal being shown partially in section to reveal the construction and arrangement of the different parts and their connection to one another and especially the connection of the pumping mechanism to the controlling and registering mechanisms; the measuring container being shown in the closed position.
Figure 2:
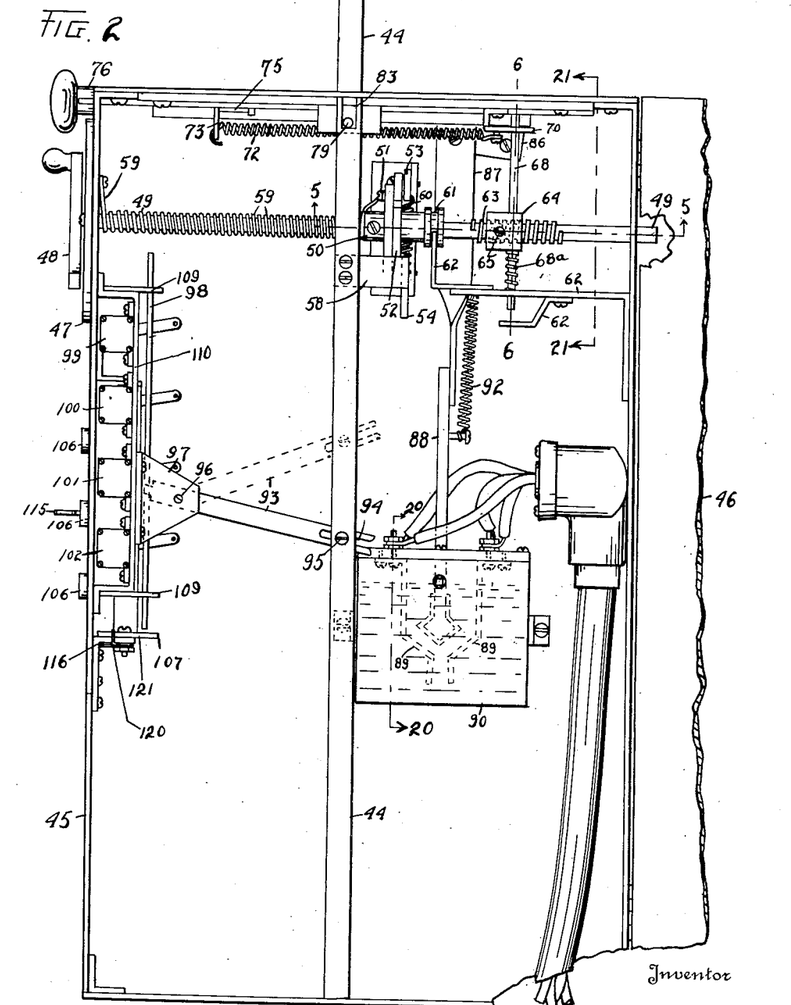
Fig. 2 is a side elevation of the casing of the controlling and registering mechanisms showing the door open and the preferred construction and arrangement of the mechanisms.

When the bar 85 is shifted by the arm 75, a spring pressed pawl 91 is moved forward into engagement with the lower end of the spring contact pin 79 as shown in Figs. 18 and 19, thereby holding said bar 85 against return until the pin 79 is released by the cam 77. A spring 92 attached at one end to the bar 88 and at the other end to the bracket 62, as shown in Fig. 2, automatically returns the above described electrical contact mechanism to the normal non-contacting position when the pawl 91 is released by the movement of the spring locking pin 79 into the locked or zero position shown in Fig. 16.

It will be observed that the operation of the pump mechanism depends upon the position of the lever 76 which will therefore be hereinafter designated as the starting lever and that when, and not before, the starting lever reaches the position shown in Fig. 18 is that mechanism free to operate. Thus when the lever 76 is retracted the pin 79 is withdrawn by the cam 77 and stop 78 from engagement with the rod 44 and at the same time the motor switch bar 88 and plates 89 are brought into contact.

Figure 16:
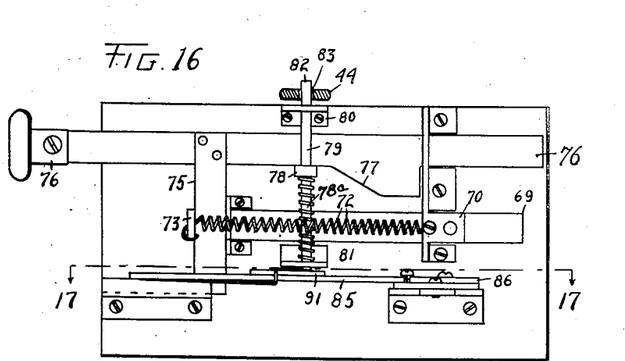
Fig. 16 is a plan view of the starting and stopping mechanism in the locked position as preferably mounted on the inner wall of the upper end of said casing, and shown in side elevation in Fig. 2, the pump actuated rod being shown in section.
Figure 17:
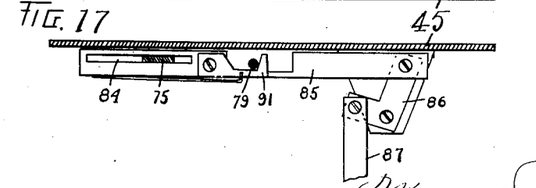
Fig. 17 is a sectional view at line 17—17 in Fig. 16 showing the switch bar raised out of contact.

The spring 72 normally tends to hold the starting lever 76 in the position shown in Fig. 16 through the engagement of the end 73 of the bar 69 with the arm 75. This movement of the bar 69, which may be designated as the return control bar, is counteracted by the pin 68 which, as above described, holds the bar in the locked position.

At a predetermined time in the step by step rotation of the shaft 49, under the influence of the spring 59 rod 44 and escapement mechanism, the stop 66 will strike the screw 65 in the nut 64. When this takes place the shaft 49 and pointer 48 have not yet reached the zero position. The contact of the stop 66 with the screw 65 turns the nut 64 downwardly and the arms 74, which enclose the stop 67 on the pin, drag the latter downwardly until the end 71 relieves the return control bar 69 and permits the spring 72 to function. As this takes place the pointer reaches the zero position and no more liquid can be measured until the mechanism is reset or unless the starting lever 76 is retracted manually.

Registering mechanism.

The operation of the registering mechanism is controlled by the raising and lowering of the rod 44 which, as pointed out above, is actuated by filling and emptying of the measuring container 29. A lever 93 having a forked end 94 which engages a pin 95 in the rod 44 is pivoted at 96 in a bracket 97. The other end of the lever 93 has a tongue which enters a notch 111 on one side of a vertically reciprocable plate 98 slidably mounted in slots of end plates 109 on the registering mechanism.

A plurality of registering counters 99, 100, 101, and 102 are mounted upon a supporting strap 110, counters 100, 101, 102 each having an actuating spring pin 103 on which is pivoted a bell crank lever 104. One arm of each lever engages a notch 112 in the edge of the plate 98. The other arm of each bell crank lever 104 engages a bolt 105 of a lock 106, an individual lock being provided for each of the individual counters 100, 101, 102, the total counter 99 not being provided with a lock. The locks 106 are of the type having a bolt 105 which extends through the casing of the lock and when locked, engages the spring bell crank lever 104 as described and when unlocked presses back a spring locking plate 107, which normally locks the slidable notched plate 98 against reciprocation.

Figure 12:
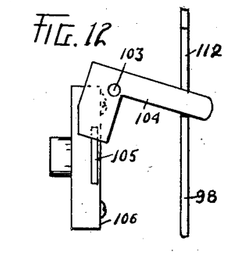
Fig. 12 is a plan view of an individual locking mechanism with the parts in the unlocked position as shown in Fig. 9.
Figure 13:
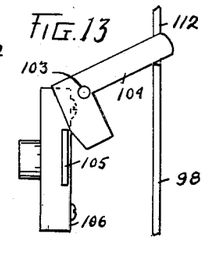
Fig. 13 is a similar view with said parts in the locked position as shown in Fig. 10.
Figure 14:
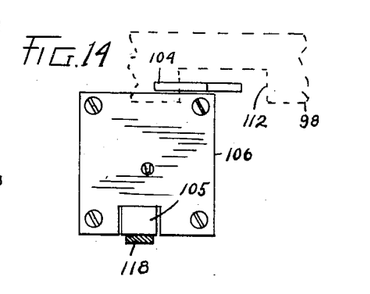
Fig. 14 is a side elevation of the locking mechanism in the unlocked position as shown in Figs. 9 and 12, the slidable notched control plate being shown in dotted outline.
Figure 15:
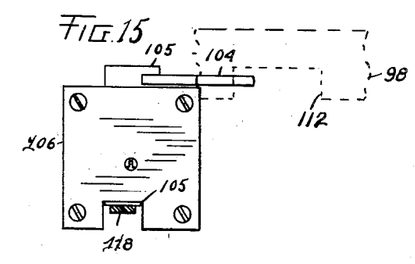
Fig. 15 is a similar view of the parts in the locked position as shown in Figs. 10 and 13.

The total counter 99 has no lock and in place of the bell crank lever 104 the pin 103 carries an arm 113 which engages in a notch 114 in the plate 98. The notch 114 is shorter than the notches 112 so that the arm 113 is actuated upon each reciprocation of the plate 98 by the rod 44. Since the notches 112 are wider the plate can be reciprocated without interference with the locked levers 104. The unlocked lever is spring held in engagement with the lower edge of its notch 112 as shown in Figs. 12 and 13 and consequently partakes of its reciprocation.

Figures 8, 9, 10, 11:
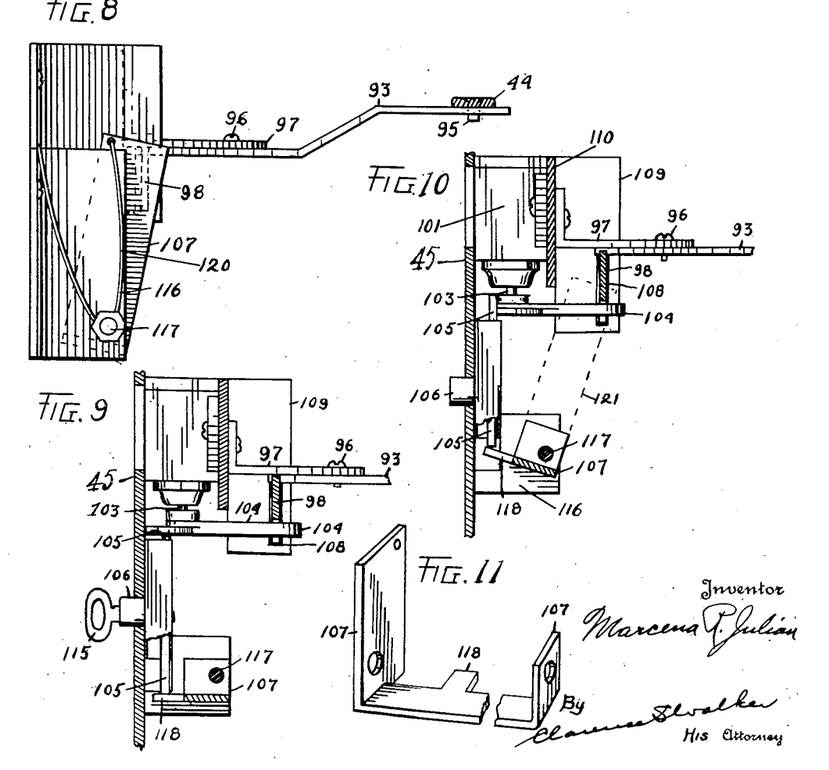
Fig. 8 is a bottom plan view of the lower end of said locking and registering mechanism in the locked position showing the connection of the mechanism to the pump actuating rod.
Fig. 9 is a sectional view taken along the line 9—9 in Fig. 7 in the direction of the arrows showing the registering mechanism and its connection to the locking and actuating mechanism, said mechanism being shown in the unlocked position.
Fig. 10 is a sectional view similar to Fig. 9 showing the parts in the locked position.
Fig. 11 is a perspective view of the pivotal spring multiple locking plate.

The bar 107, by which the plate 98 is locked, is pivoted upon a bolt 117 carried by brackets 116, 119. A spring 120 normally holds the bar 107 in the position shown in Fig. 8 in which the lower end 121 lies across the path of the plate 98 and permits its reciprocation. The bar 107 has a plurality of tongues 118 one in alignment with each bolt 105 of the locks 106 so when one is unlocked the lever 104 is not only released as above described but in addition the travel of the bolt 105 causes the bar 107 to be shifted into the releasing position so that the plate 98 can be reciprocated.

Any number of individual counters may be used in connection with this registering mechanism according to the number of operators who use the same, said registering mechanism being preferably of any suitable construction for attaining the purpose, of which there are a number now in use on the market.

Summary.

The operation of this embodiment consists in first unlocking any individual lock 106 by turning the key 115, second setting the pointer 48 on the dial 47 to the number of units which it is desired to measure, as for example, seven as shown in dotted outline in Fig. 3, and third retracting the operating lever 76 thereby releasing the pump actuated bar 44 by the withdrawal of the spring locking pin 79 from the slot 83 in said bar 44.

This movement of the lever 76 also actuates the contacting mechanism for the electrical switch 90, thereby providing the pumping mechanism with power to operate the same and cause, through the filling and emptying of the measuring container 29, the reciprocal movement of the rod 44. The lever 93 as the rod 44 is reciprocated upwardly and downwardly, as shown in the dotted outline in Fig. 2, actuates the individual unlocked counter and the total counter 99. The continued reciprocation of the rod 44 causes a step by step movement of the control mechanism, as hereinbefore described, until the last or seventh step, when the escape mechanism will cause all the control parts to return to the normal zero position, having measured and delivered the exact number of units desired, registering said units upon the counter of the individual operator who unlocked the mechanism and upon the total counter 99.

The control mechanism may be actuated for a single unit by retracting the actuating lever 76 after one of the individual counters has been unlocked, so that if, for example, an additional unit is needed, all that is necessary is to pull out said actuating lever 76 and the parts will act for the single unit.

While certain embodiments of this invention have been shown and described, I am not to be limited thereto since it is obvious that others may be made without departing from the spirit and scope of the invention as set forth in the following claims.

Having thus set forth my invention, what I claim as new and for which I desire the protection of Letters Patent is:

1. In a liquid measuring pump having a reciprocatory rod which is raised and lowered once for each unit of liquid measured, a registering mechanism including a reciprocable plate, a lever connecting said plate and said rod, and key controlled means normally preventing the reciprocation of said plate.

2. In a liquid measuring pump having a reciprocatory rod which is raised and lowered once for each unit of liquid measured, a registering mechanism including a reciprocable plate, a lever connecting said plate and said rod, means normally preventing the reciprocation of said plate, a plurality of counters certain of which are key controlled and means whereby the unlocking of any of said counters retracts said preventing means and permits the reciprocation of said plate.

3. In a liquid measuring pump having a reciprocatory rod which is raised and lowered once for each unit of liquid measured, and a registering mechanism connected to said rod, said mechanism including a plurality of counters all but one of which are locked and unlocked by separate keys, the remaining counter operating in unison with whichever counter is unlocked.

4. In a liquid measuring pump having a reciprocatory rod which is raised and lowered once for each unit of liquid measured, a registering mechanism including a reciprocable plate, a lever connecting said plate and said rod, a plurality of counters, each counter having an arm which is adapted to be actuated upon the reciprocation of said plate, all but one of said indicators adapted to be locked and unlocked, means normally preventing the reciprocation of said plate, and means operated by the unlocking of any of said counters for retracting said preventing means.

5. In a liquid measuring pump having a reciprocatory rod which is raised and lowered upon the measuring of each unit of liquid, a registering mechanism, including a reciprocable plate, a lever connecting said rod and said plate whereby said plate is actuated by said rod, a pivoted plate normally preventing the actuation of said reciprocable plate, and a bolt which, in one position, retracts said pivoted plate to permit the actuation of said reciprocable plate.

6. In a liquid measuring pump having a reciprocatory rod which is raised and lowered upon the measuring of each unit of liquid, a registering mechanism, including a reciprocable plate, a lever connecting said rod and said plate whereby said plate is actuated by said rod, a pivoted plate normally preventing the actuation of said reciprocable plate, a bolt which, in one position, retracts said pivoted plate to permit the actuation of said reciprocable plate, a plurality of counters, and a separate lock for each counter, the unlocking of any of said locks causing said bolt to retract said pivoted plate.

7. In a liquid measuring pump having a reciprocatory rod which is raised and lowered upon the measuring of each unit of liquid, means for locking said rod against movement, a starting lever for retracting said locking means, a locking pin for holding said lever in starting position, a shaft, an escapement wheel carried by said shaft and operated by said rod and a nut threaded on said shaft and adapted when a predetermined position has been reached to retract said locking pin thus releasing said starting lever and causing the rod locking means to function.

8. In a liquid measuring pump having a reciprocatory rod which is raised and lowered upon the measuring of each unit of liquid, a shaft, a dial through which one end of said shaft projects, a handle on the projecting end of said shaft, an escapement wheel on said shaft having beveled teeth, escapement levers in engagement with said teeth and normally preventing rotation of said wheel and shaft in one direction while permitting rotation in the other direction by operation of said handle, spring means tending to rotate said wheel and shaft in said first direction, means on said rod for contacting against said levers alternately during the reciprocation of said rod and causing a step by step rotation of said wheel and shaft.

9. In a liquid measuring pump, a casing, a dial provided with a series of figures on said casing, a shaft terminating at the center of said dial, a handle on said shaft, said handle also functioning as a pointer with reference to said dial whereby said shaft can be rotated by said handle when the latter is used as a pointer to indicate the number of units of liquid to be measured, said pump having a reciprocating rod which is raised and lowered upon the measuring of each unit of liquid, means for preventing the reciprocation of said rod, a starting lever for retracting said preventing means, a connection between said rod and said shaft whereby the reciprocation of said rod rotates said shaft, a pin holding said lever in starting position, means on said shaft for shifting said pin when the handle pointer indicates zero on said dial and spring means for returning said lever to idle position when said pin is shifted and for shifting said preventing means into engagement with said rod.

In testimony whereof I have affixed my signature.

MARCENA R. JULIAN.